(12) United States Patent
Shtrom et al.

(10) Patent No.: US 11,235,779 B2
(45) Date of Patent: *Feb. 1, 2022

(54) DUAL-MEASUREMENT DATA STRUCTURE FOR AUTONOMOUS VEHICLES

(71) Applicant: Augmented Radar Imaging, Inc., Los Altos, CA (US)

(72) Inventors: Victor Shtrom, Los Altos, CA (US); Ketan Narendra Patel, Cupertino, CA (US); Todd Gustavson, Sunnyvale, CA (US); Darin Milton, Campbell, CA (US); Janine Cheng, San Francisco, CA (US)

(73) Assignee: Augmented Radar Imaging, Los Altos, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/836,486

(22) Filed: Mar. 31, 2020

(65) Prior Publication Data

US 2020/0223447 A1 Jul. 16, 2020

Related U.S. Application Data

(63) Continuation of application No. 16/004,876, filed on Jun. 11, 2018, now Pat. No. 10,647,328.

(51) Int. Cl.
*B60W 50/023* (2012.01)
*G05D 1/00* (2006.01)

(52) U.S. Cl.
CPC ......... *B60W 50/023* (2013.01); *G05D 1/0088* (2013.01); *B60W 2420/403* (2013.01); *B60W 2420/52* (2013.01); *B60W 2420/54* (2013.01); *B60W 2422/95* (2013.01); *G05D 2201/0213* (2013.01)

(58) Field of Classification Search
None
See application file for complete search history.

(56) References Cited

U.S. PATENT DOCUMENTS

2017/0168494 A1* 6/2017 Sibenac ............... G05D 1/0088
2018/0170373 A1* 6/2018 Kwon ................... B60W 10/30

* cited by examiner

*Primary Examiner* — Lail A Kleinman
(74) *Attorney, Agent, or Firm* — Steven Stupp

(57) ABSTRACT

During a measurement technique, an electronic device may receive first sensor information associated with a first field of view and a first timestamp, and second sensor information associated with a second field of view and a second timestamp. For example, the electronic device may perform a first measurement using a first sensor and performing a second, different type of measurement using a second sensor. Therefore, the first sensor information and the second sensor information may be associated with different types of sensors. Moreover, the first timestamp and the second timestamp may be concurrent or in close temporal proximity, and the first field of view and the second field of view may at least substantially overlap. Then, the electronic device may store the first sensor information and the second sensor information in memory. In some embodiments, the electronic device stores the first timestamp and the second timestamp in the memory.

20 Claims, 16 Drawing Sheets

DUAL-MEASUREMENT DATA STRUCTURE FOR AUTONOMOUS VEHICLES

CROSS REFERENCE TO RELATED APPLICATIONS

This application is a continuation of U.S. patent application Ser. No. 16/004,876, "Dual-Measurement Data Structure for Autonomous Vehicles," by Victor Shtrom et al., filed on Jun. 11, 2018, the contents of which are herein incorporated by reference.

BACKGROUND

Field

The described embodiments relate to techniques for performing sensor measurements, for generating an annotated dataset using the sensor measurements and additional measurements, and training a predictive model based on the annotated dataset.

Related Art

Self-driving (which is sometimes referred to as 'autonomous driving') is an emerging technology that is expected to revolutionize the automotive and trucking industries, as well as mass transit. In addition, self-driving or autonomous vehicles can enable new products and services, such as ride-sharing services. Consequently, self-driving is a disruptive technology that, if brought to fruition, can impact a significant fraction of the national economy.

An autonomous vehicle typically uses a sensor technology to monitor a surrounding environment, so that the autonomous vehicle can navigate with limited or without human input. For example, the sensor technology may include laser light, such as light detection and ranging (lidar). Then, advanced control systems in the autonomous vehicle may analyze this sensor information to identify signs and obstacles (such as pedestrians, bicyclists and/or other cars), and to appropriately navigation the autonomous vehicle.

However, there are obstacles to the adoption of self-driving technology. In particular, the sensor technology and the associated control systems need to reliably and accurately identify the signs and obstacles in order for an autonomous vehicle to correctly navigate in a wide variety of traffic and environmental conditions (including day, night, bad weather, congested traffic, etc.). Moreover, the consequences of an error can be serious. For example, if an error occurs during operation of a self-driving car, serious injuries and significant liability may occur.

Moreover, there are also economic constraints on self-driving technology. Notably, in order to facilitate wide adoption, the sensor technology used in an autonomous vehicle usually needs to have very low cost. However, it has proven difficult to sufficiently reduce the price of many sensor technologies.

In the absence of a low-cost, reliable and accurate sensor technology, it may be difficult to achieve autonomous vehicles, which is frustrating for consumers.

SUMMARY

A first group of described embodiments relates to an electronic device. During operation, the electronic device receives an optical image associated with an object and other sensor information associated with the object, where the optical image and the other sensor information have associated timestamps that are concurrent or in close temporal proximity. Then, the electronic device identifies an object based at least in part on the optical image and/or the other sensor information. Moreover, the electronic device extracts a signature associated with the object from the other sensor information. Next, the electronic device stores annotation information associated with the identified object and the extracted signature in a data structure in memory, such as a computer-readable storage medium.

In some embodiments, the electronic device acquires the optical image and performs another measurement of the other sensor information. Note that the electronic device may include multiple antennas. A first subset of the antennas may be used to transmit signals, and a second subset of the antennas may be used to receive signals. The first subset and the second subset may be dynamically adapted.

Moreover, the electronic device may train a predictive model based at least in part on information in the data structure.

Furthermore, the other sensor information may include radar information.

Additionally, the signature may include multiple dimensions. For example, the signature may include one or more of: a range to the object, a first angle to the object along a first axis, Doppler information associated with the object and/or a second angle to the object along a second axis.

In some embodiments, the electronic device includes an integrated circuit that performs one or more of the aforementioned operations of the electronic device. Alternatively or additionally, the electronic device may include a processor and the same or a different memory. This memory may store a program module. When executed by the processor, the program module may cause the electronic device to perform one or more of the aforementioned operations of the electronic device.

Moreover, the electronic device may include an interface circuit that receives the optical image and the other sensor information.

Another embodiment provides the integrated circuit for use with the electronic device. In some embodiments, the integrated circuit includes at least an imaging sensor that acquires the optical image and another sensor that acquires the other sensor information.

Another embodiment provides a computer-readable storage medium for use with the electronic device. This computer-readable storage medium may include the program module that, when executed by the electronic device, causes the electronic device to perform at least some of the aforementioned operations of the electronic device.

Another embodiment provides a method. This method includes at least some of the operations performed by the electronic device.

A second group of described embodiments relates to an electronic device. During operation, the electronic device receives first sensor information associated with a first field of view and a first timestamp, and second sensor information associated with a second field of view and a second timestamp. The first sensor information and the second sensor information are associated with different types of sensors. Moreover, the first timestamp and the second timestamp are concurrent or in close temporal proximity, and the first field of view and the second field of view at least substantially overlap. Then, the electronic device stores the first sensor information and the second sensor information in memory, such as a computer-readable storage medium. Furthermore, the electronic device may store the first timestamp and the second timestamp in the memory.

Note that the first sensor information and the second sensor information may be associated with operation of a vehicle (such as a car or truck) having one or more non-retractable wheels and that includes the electronic device. During operation of the vehicle, the wheels contact a road or the ground.

In some embodiments, receiving the first sensor information, the first timestamp, the second sensor information and the second timestamp involves performing a first measurement using a first sensor and performing a second, different type of measurement using a second sensor. For example, the electronic device may include or may be coupled to the first sensor and the second sensor. The first sensor and the second sensor may be located in the same plane (i.e., coplanar) and/or apertures for the first sensor and the second sensor may be adjacent to each other or may be co-located.

Moreover, when performing the first measurement or the second measurement, the electronic device may determine an environmental condition (such as light intensity, e.g., a luminance level, a weather condition, a temperature, etc.). Then, based on the determined environmental condition, the electronic device may perform a remedial action. For example, the electronic device may provide selective illumination, such as a two or three-dimensional array of dots, a pattern of stripes, an illumination pattern, etc.

Alternatively or additionally, the electronic device may provide illumination having a wavelength using a source, such as illumination with monochromatic light or light having a single wavelength. This source may be included in or may be coupled to the electronic device.

Furthermore, the first sensor and the second sensor may include two or more of: a radar sensor, an optical imaging sensor, an infrared sensor, a forward looking infrared (FLIR) sensor, a sonar sensor, an optical imaging sensor having a dynamic range or contrast ratio exceeding a threshold value (such as 120 dB), lidar, etc. Note that a given sensor may be capable of transmitting and/or receiving signals.

Note that the electronic device may be a portable electronic device.

Moreover, prior to storing the first sensor information and the second sensor information, the electronic device may determine one or more quality-control metrics based at least in part on the first sensor information and the second sensor information. The one or more quality-control metrics may be stored in the memory and may be associated with the first sensor information and/or the second sensor information, e.g., they may be stored at memory location that is associated with the first sensor information and/or the second sensor information. Alternatively, the storing of the first sensor information and the second sensor information may be conditional or selective based at least in part on the one or more quality-control metrics.

Another embodiment provides the vehicle.

Another embodiment provides an integrated circuit for use with the electronic device. This integrated circuit may perform at least some of the aforementioned operations of the electronic device. In some embodiments, the integrated circuit includes at least the first sensor and the second sensor.

Another embodiment provides a computer-readable storage medium for use with the electronic device. This computer-readable storage medium may include the program module that, when executed by the electronic device, causes the electronic device to perform at least some of the aforementioned operations of the electronic device.

Another embodiment provides a method. This method includes at least some of the operations performed by the electronic device.

A third group of embodiments provides a sensor module for use with a vehicle (such as a car, a truck, a bus, etc.) having one or more non-retractable wheels. The sensor module is positioned on a side-facing surface of the vehicle. During operation, the sensor module transmits radar signals approximately perpendicular to a direction of motion of the vehicle. Then, the sensor module receives reflected radar signals. Furthermore, the sensor module analyzes a time sequence of the reflected radar signals. Next, the sensor module determines a location of the vehicle based at least in part on the analyzed time sequence of reflected radar signals.

In some embodiments, the sensor module includes or is coupled to multiple antennas. A first subset of the antennas may be used to transmit the radar signals, and a second subset of the antennas may be used to receive the reflected signals. Note that the first subset and the second subset may be dynamically adapted.

Additionally, the sensor module may include an oscillator that provides two or more synchronized radar signals to different antennas at different locations on the vehicle.

Note that the analysis of the time sequence may provide a synthetic aperture for the reflected radar signals.

Alternatively, the sensor module may transmit the radar signals approximately parallel to the direction of motion of the vehicle. In these embodiments, the sensor module may be located on a front-facing or a rear-facing surface of the vehicle.

Another embodiment provides an integrated circuit for use with the sensor module. This integrated circuit may perform at least some of the aforementioned operation of the sensor module.

Another embodiment provides a computer-readable storage medium for use with the sensor module. This computer-readable storage medium may include the program module that, when executed by the sensor module, causes the sensor module to perform at least some of the aforementioned operations of the sensor module.

Another embodiment provides a method. This method includes at least some of the operations performed by the sensor module.

Another embodiment provides the vehicle.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
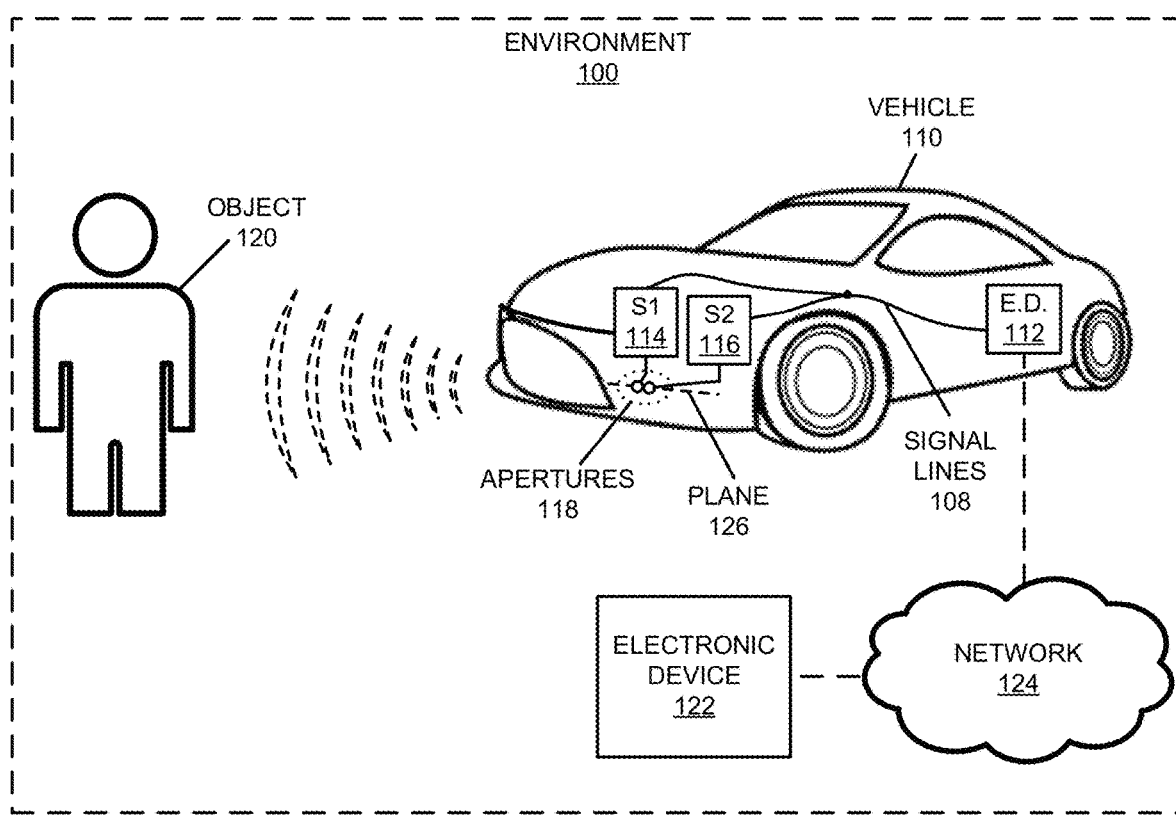
FIG. 1 is a drawing illustrating an environment that includes a vehicle in accordance with an embodiment of the present disclosure.

In a first group of embodiments, an annotation technique is described. During the annotation technique, an electronic device may receive an optical image associated with an object and other sensor information associated with the object, where the optical image and the other sensor information have associated timestamps that are concurrent or in close temporal proximity. For example, the electronic device may access the optical image and the other sensor information in memory. Alternatively, the electronic device may acquire the optical image and may perform another measurement of the other sensor information, such as radar measurements. Then, the electronic device may identify the object based at least in part on the optical image and/or the other sensor information. Moreover, the electronic device may extract a signature associated with the object from the other sensor information. The signature may include: a range to the object, a first angle to the object along a first axis, Doppler information associated with the object and/or a second angle to the object along a second axis. Next, the electronic device may store annotation information associated with the identified object and the extracted signature in a data structure in the same or a different memory.

By generating the annotated dataset, this annotation technique may facilitate accurate training of a predictive model based on the annotated dataset. Moreover, the annotated dataset may facilitate the use of a sensor technique (such as radar) other than optical imaging in a self-driving application. Radar sensors can be low cost and reliable in a wide variety of environmental conditions. In conjunction with the accurate annotated dataset, these attributes may allow radar to be used effectively in autonomous vehicles. Consequently, the annotation technique may facilitate autonomous vehicles.

In a second group of embodiments, a measurement technique is described. During the measurement technique, an electronic device may receive first sensor information associated with a first field of view and a first timestamp, and second sensor information associated with a second field of view and a second timestamp. For example, the electronic device may perform a first measurement using a first sensor and performing a second, different type of measurement using a second sensor. Therefore, the first sensor information and the second sensor information may be associated with different types of sensors. Moreover, the first timestamp and the second timestamp may be concurrent or in close temporal proximity, and the first field of view and the second field of view may at least substantially overlap. Then, the electronic device may store the first sensor information and the second sensor information in memory. In some embodiments, the electronic device stores the first timestamp and the second timestamp in the memory.

By generating a dataset with concurrent, different types of measurements having fields of view with at least substantial overlap, the measurement technique may facilitate accurate training of a predictive model based on the dataset. Moreover, the dataset may facilitate the use of a sensor technique in a self-driving application. Consequently, the measurement technique may facilitate autonomous vehicles.

In a third group of embodiments, a location technique is described. During the location technique, a sensor module in a vehicle, which has one or more non-retractable wheels in contact with a driving surface, determines a location of the vehicle. In particular, the sensor module is positioned on or in a direction of a side-facing surface of the vehicle. During operation, the sensor module may transmit radar signals approximately perpendicular to a direction of motion of the vehicle. Then, the sensor module may receive reflected radar signals. Furthermore, the sensor module may analyze a time sequence of the reflected radar signals. Next, the sensor module may determine the location of the vehicle based at least in part on the analyzed time sequence of reflected radar signals.

By determining the location of the vehicle using synthetic aperture radar, the location technique may facilitate a self-driving application. Consequently, the measurement technique may facilitate autonomous vehicles.

In the discussion that follows, radar is used as an illustrative example of the other sensor technique. For example, the radar may involve radar signals having a fundamental frequency of 24 GHz, 77-81 GHz, 140 GHz, and/or another electromagnetic signal having a fundamental frequency in the radio or microwave frequency band. Moreover, the radar signals may be continuous wave and/or pulsed, may modulated (such as using frequency modulation or pulse modulation) and/or may be polarized. In particular, the radar signals may be frequency-modulated continuous-wave, pulse-modulated continuous-wave, multiple-input multiple-output (MIMO), etc. However, a wide variety of sensor techniques may be used in conjunction with or to implement the annotation technique and/or the measurement techniques. For example, the sensor techniques may include: optical imaging in the visible spectrum or a visible frequency band, infrared, sonar, FLIR, optical imaging having a dynamic range or contrast ratio exceeding a threshold value (such as 120 dB), lidar, etc.

Moreover, in the discussion that follows, the electronic device may communicate using one or more of a wide variety of communication protocols. For example, the communication may involve wired and/or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth® (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Ethernet and universal serial bus (USB) are used as illustrative examples.

We now describe some embodiments of a measurement technique, an annotation technique and a location technique. FIG. 1 presents a drawing illustrating an example of an environment 100 that includes a vehicle 110. For example, vehicle 110 may include: a car or automobile, a bus, a truck, etc., and more generally one that includes one or more non-retractable wheels in contact with a surface (such as a road or the ground) during operation. As described further below with reference to FIG. 2, vehicle 110 may include an electronic device (E.D.) 112 that collects sensor information associated with different types of measurements. In particular, while vehicle 110 moves or navigates through environment 100, electronic device 112 may collect first sensor information associated with sensor (S1) 114, and may collect second sensor information associated with sensor (S2) 116, where sensor 114 is a different type of sensor than sensor 116. Note that sensors 114 and 116 may be included in electronic device 112. Alternatively, sensors 114 and 116 may be coupled to electronic device 112, such as by electrical signal lines, optical signal lines, a cable and/or a bus, which is illustrated by signal lines 108.

Moreover, in order to obtain accurate and useful sensor information about environment 100, sensors 114 and 116 may be in the same plane or may be coplanar in plane 126. In addition, apertures 118 of or associated with sensors 114 and 116 may be adjacent to each other or may be co-located (i.e., at the same location on vehicle 110). This may ensure that sensors 114 and 116 capture or obtain sensor information of substantially the same portions of environment 100 and objects (such as object 120) in environment 100. Therefore, sensors 114 and 116 may have at least substantially overlapping fields of view in environment 100, such as fields of view that are more than 50, 75, 80 or 90% in common.

In some embodiments, sensor 114 performs optical imaging in a visible spectrum or a visible frequency band (such as at least a frequency between 430 and 770 THz or at least a wavelength between 390 and 700 nm), and sensor 116 performs radar measurements of radar information. However, more generally, sensors 114 and 116 may perform at least a pair of different measurements. For example, sensors 114 and 116 may include two or more of: a radar sensor, an optical imaging sensor in the visible spectrum or the visible frequency band, an infrared sensor, a FLIR sensor, a sonar sensor, an optical imaging sensor having a dynamic range or contrast ratio exceeding a threshold value (such as 120 dB), lidar, etc. More generally, as described further below with reference to FIGS. 6-9, sensor 114 may acquire first sensor information of object 120 that, using an identification/classification technique, can be associated with a known annotation, and this annotation can be then applied to the second sensor information of object 120. Note that a given sensor may be capable of transmitting and/or receiving signals.

Figure 2:
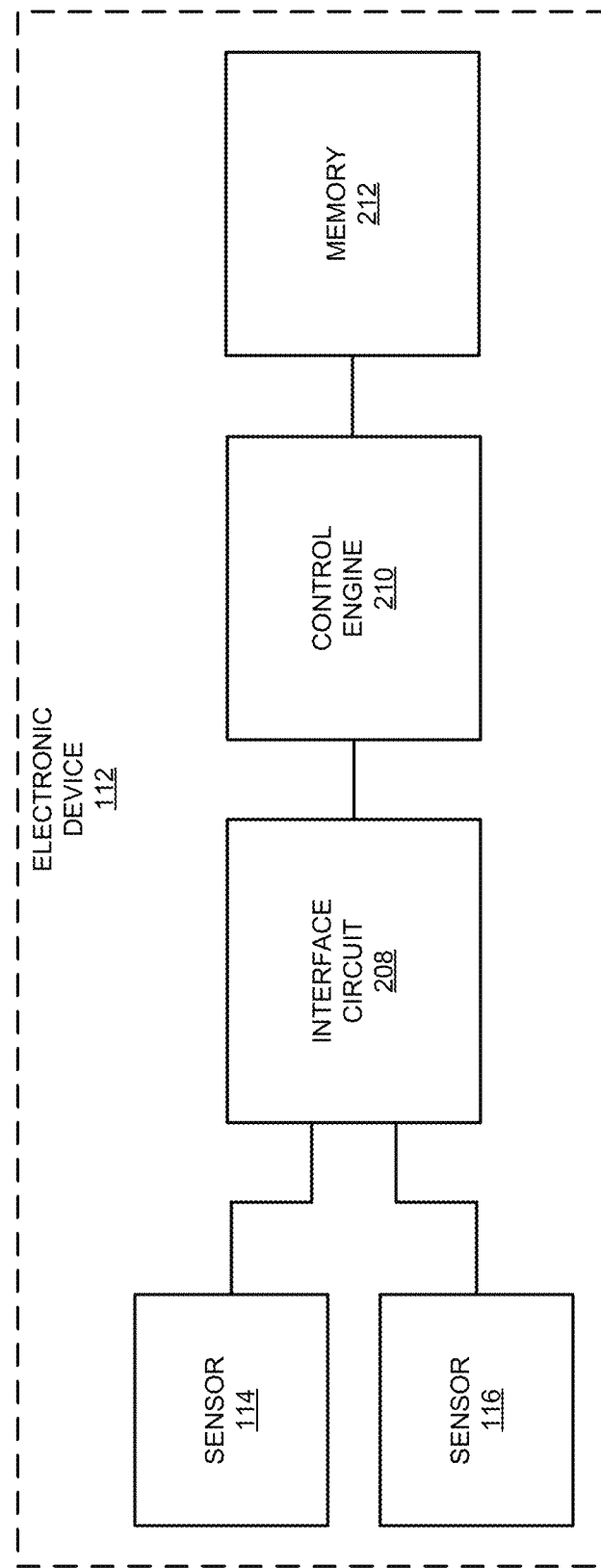
FIG. 2 is a block diagram illustrating an electronic device that is included on the vehicle in FIG. 1 in accordance with an embodiment of the present disclosure.

FIG. 2 presents a block diagram illustrating an example of electronic device 112. As described further below with reference to FIG. 16, this electronic device may include a control engine 210 (such as an integrated circuit and/or a processor, which are sometimes referred to as 'control logic') that performs the measurement technique. In particular, control engine 210 may provide, via interface circuit 208, one or more signals or instructions to sensors 114 and 116 (which may be included in or coupled to electronic device 112, and thus are optional in electronic device 112 in FIG. 2) to acquire, respectively, the first sensor information and the second sensor information. For example, sensor 114 may measure an optical image, and sensor 116 may measure radar information. Then, sensors 114 and 116 may provide the first sensor information and the second sensor information to control engine 210. In some embodiments, the first sensor information includes an associated first timestamp when the first sensor information was measured, and the second sensor information includes an associated second timestamp when the second sensor information was measured. Alternatively, control engine 210 may generate the first timestamp and the second timestamp when, respectively, the first sensor information and the second sensor information are received.

Next, control engine 210 may store the first sensor information and the second sensor information in memory 212. For example, as described further below with reference to FIG. 3, the first sensor information and the second sensor information may be stored in associated memory locations. In some embodiments, the first sensor information and the second sensor information are stored in memory along with the first timestamp and the second timestamp.

Furthermore, control engine 210 may optionally perform one or more quality-control operations on the first sensor information and the second sensor information. For example, control engine 210 may analyze a light intensity or luminance level in an optical image and may compare the luminance level to a threshold value. Alternatively or additionally, control engine 210 may analyze the optical image or the radar information to determine a signal-to-noise ratio, and then may compare the signal-to-noise ratio to another threshold value. In some embodiments, control engine 210 may analyze the first sensor information and the second sensor information to confirm that each include information associated with the same object (such as object 120 in FIG. 1).

Based on the results of the one or more quality-control operations, control engine 210 may perform a remedial action. For example, control engine 210 may store a quality-control metric with the first sensor information and/or the second sensor information, such as a quality-control metric that indicates 'pass' (such as when the luminance level exceeds the threshold value, the signal-to-noise ratio exceeds the other threshold value and/or the first sensor information includes the same object as the second sensor information), 'fail' (such as when the luminance level is less than the threshold value, the signal-to-noise ratio is less than the other threshold value and/or the second sensor information includes the same object as the first sensor information) or 'further analysis required' (such as when the results of the one or more quality-control operations are mixed). Alternatively, control engine 210 may erase the first sensor information and/or the second sensor information when either fails the one or more quality-control operations.

Separately or additionally, in some embodiments quality control is optionally performed while the first sensor information and/or the second sensor information are measured. For example, when performing a first measurement of the first sensor information using sensor 114 and/or a second measurement of the second sensor information using sensor 116, control engine 210 (and/or sensor 114 or sensor 116, respectively) may determine an environmental condition (such as light intensity, e.g., a luminance level, a weather condition such as fog, a temperature, e.g., greater than 90 F, etc.) and/or information associated with an object (such as object 120 in FIG. 1). For example, control engine 210 may determine whether the object is two dimensional (such as a sign) or three dimensional (such as a person or an animal). Then, based on the determined environmental condition and/or information associated with the object, control engine 210 (and/or sensor 114 or sensor 116, respectively) may perform a remedial action. For example, control engine 210 may increase a transmit power of radar signals, or may use different filtering and/or a longer integration time in conjunction with an infrared sensor. Alternatively or additionally, control engine 210 may provide one or more signals or instructions to a source in or coupled to electronic device 112 (such as a source included in or associated with sensor 114 and/or 116) so that selective illumination is output, such as a two or three-dimensional array of dots, a pattern of stripes, an illumination pattern, etc. This selective illumination may improve the ability to resolve structure of a three-dimensional object. In some embodiments, control engine 210 may provide one or more signals or instructions to a source in or coupled to electronic device 112 (such as a source, e.g., a vertical-cavity surface-emitting laser or vcsel, included in or associated with sensor 114 and/or 116) so that illumination having a wavelength is output (e.g., illumination at a particular wavelength). This constant-wavelength illumination may allow the first sensor information and/or the second sensor information to be acquired when the signal-to-noise ratio is low.

Figure 3:
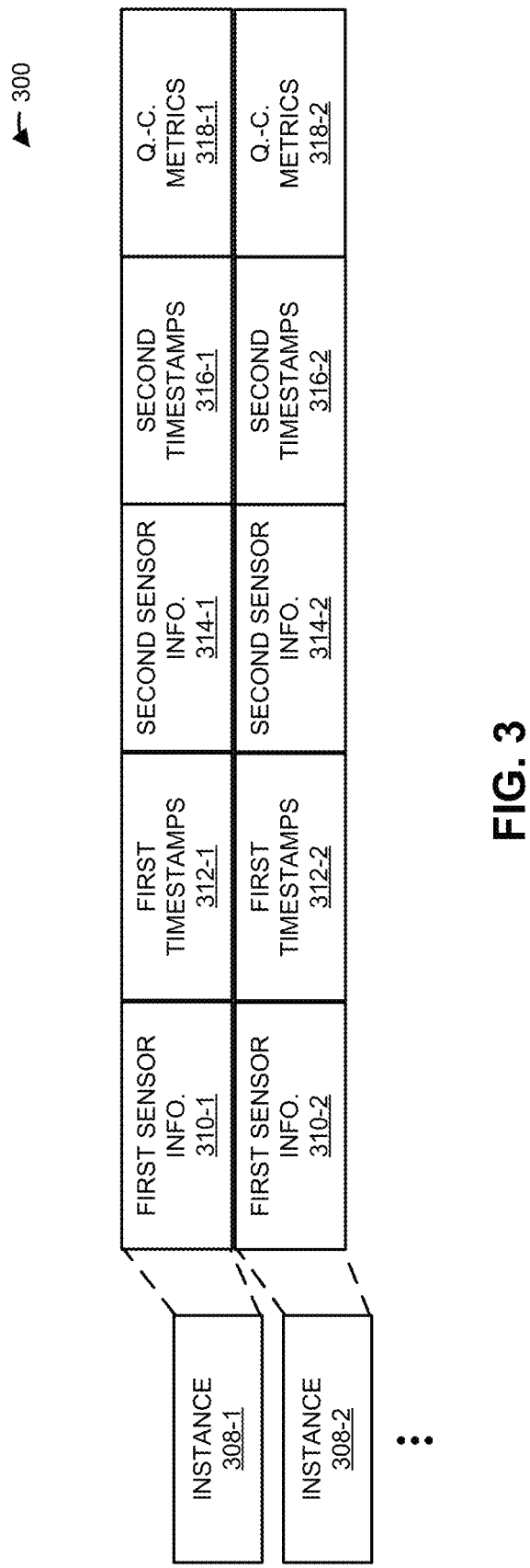
FIG. 3 is a block diagram illustrating a data structure for use in conjunction with the electronic device of FIGS. 1 and 2 in accordance with an embodiment of the present disclosure.

FIG. 3 presents a block diagram illustrating an example of a data structure 300 for use in conjunction with electronic device 112 (FIGS. 1 and 2), such as in memory in or associated with electronic device 112 (FIGS. 1 and 2). In particular, data structure 300 may include: one or more instances 308 of first sensor information 310, optional associated first timestamps 312, one or more instances of second sensor information 314, optional associated second timestamps 316 and/or one or more quality-control (Q.-C.) metrics 318 associated with the one or more instances of first sensor information 310 and/or associated with the one or more instances of second sensor information 314. Note that data structure 300 may include fewer or additional fields, two or more fields may be combined, and/or a position of a given field may be changed.

Figure 4:
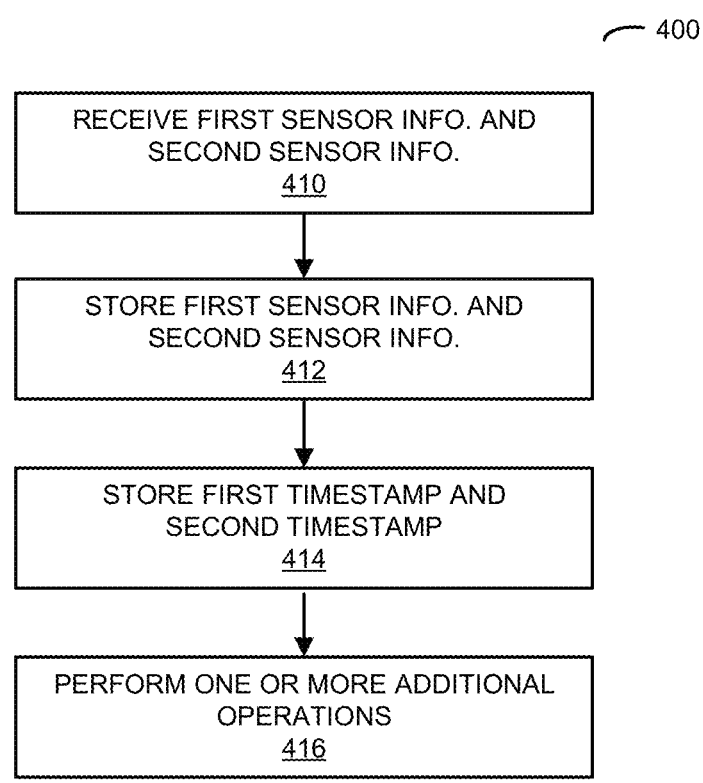
FIG. 4 is a flow diagram illustrating a method for acquiring sensor data in accordance with an embodiment of the present disclosure.

FIG. 4 presents a flow diagram illustrating an example of a method 400 for acquiring sensor data. This method may be performed by an electronic device (such as electronic device 112 in FIGS. 1 and 2) or a component in the electronic device (such as an integrated circuit or a processor). During operation, the electronic device may receive first sensor information (operation 410) associated with a first field of view and may receive a first timestamp, and second sensor information (operation 410) associated with a second field of view and may receive a second timestamp. The first sensor information and the second sensor information may be associated with different types of sensors, such as different types of sensors. For example, the first sensor and the second sensor may include two or more of: a radar sensor, an optical imaging sensor in a visible spectrum or a visible frequency band, an infrared sensor, a FLIR sensor, a sonar sensor, an optical imaging sensor having a dynamic range or contrast ratio exceeding a threshold value (such as 120 dB), lidar, etc. Note that a given sensor may be capable of transmitting and/or receiving signals.

Moreover, the first timestamp and the second timestamp may be concurrent or in close temporal proximity (such as within 1 ms, 5 ms, 10 ms, 50 ms, 100 ms, 150 ms or 300 ms), and the first field of view and the second field of view may at least substantially overlap. Then, the electronic device may store the first sensor information and the second sensor information (operation 412) in memory, such as a computer-readable storage medium. Furthermore, the electronic device may optionally store the first timestamp and the second timestamp (operation 414) in the memory (e.g., in data structure 300 in FIG. 3), such as in fields that are, respectively, associated with those of the first sensor information and the second sensor information.

In some embodiments, method 400 includes one or more optional additional operations (operation 416). For example, receiving the first sensor information, the first timestamp, the second sensor information and the second timestamp (operation 410) involves performing a first measurement using a first sensor and performing a second, different type of measurement using a second sensor. Note that the electronic device may include or may be coupled to the first sensor and the second sensor. Moreover, the first sensor and the second sensor may be located in the same plane (i.e., coplanar) and/or apertures for the first sensor and the second sensor may be adjacent to each other or may be co-located.

Furthermore, when performing the first measurement or the second measurement, the electronic device may determine an environmental condition (such as light intensity, e.g., a luminance level, a weather condition, a temperature, etc.). Then, based on the determined environmental condition, the electronic device may perform a remedial action. For example, the electronic device may provide selective illumination, such as a two or three-dimensional array of dots, a pattern of stripes, and/or an illumination pattern. Alternatively or additionally, the electronic device may provide illumination having a wavelength using a source, such as illumination with monochromatic light or light having a single wavelength. This source may be included in or may be coupled to the electronic device.

In some embodiments, the electronic device determines one or more quality-control metrics for the first sensor information and/or the second sensor information. Then, the electronic device may perform a remedial action based on the one or more quality-control metrics. For example, the one or more quality-control metrics may be stored in the memory along with the first sensor information and/or the second sensor information. Alternatively, based on the one or more quality-control metrics, the electronic device may erase the first sensor information and/or the second sensor information.

Note that the electronic device may be a portable or removable electronic device, such as a measurement or sensor module that is installed in the vehicle.

Figure 5:
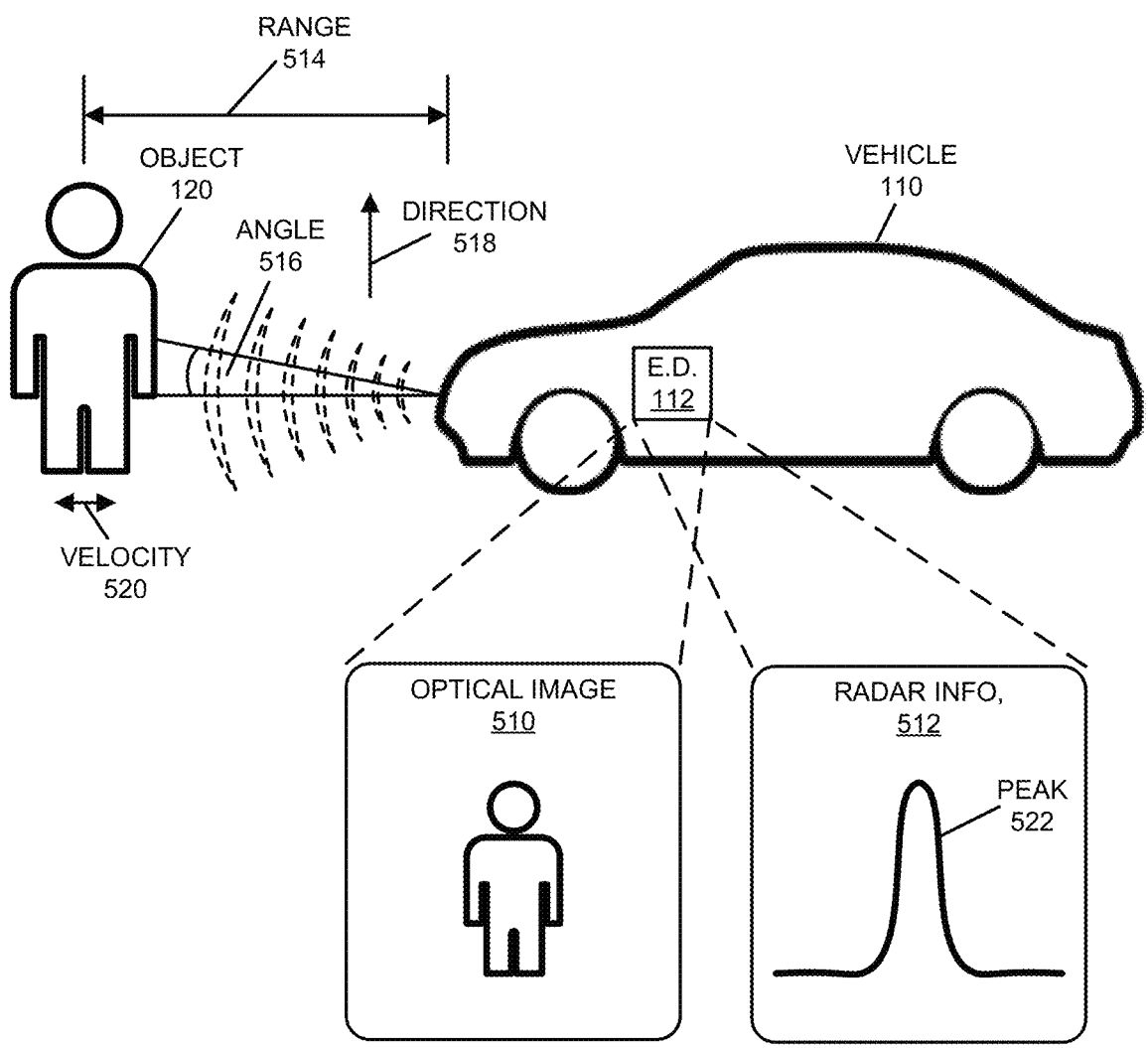
FIG. 5 is a drawing illustrating acquisition of sensor data using the electronic device of FIGS. 1 and 2 in accordance with an embodiment of the present disclosure.

Embodiments of the measurement technique are further illustrated in FIG. 5, which presents a drawing illustrating an example of acquisition of sensor data using electronic device 112. While vehicle 110 is operating, electronic device 112 may receive the first sensor information and/or the second sensor information from sensors 114 and 116 (FIG. 1). For example, sensor 114 may acquire an optical image 510 of object 120 that includes object 120 and sensor 116 may concurrently (or approximately concurrently, such as with a time delay of less than 300 ms) acquire radar information 512 associated with object 120. Note that radar information 512 may include: information associated with a range 514 between sensor 116 (FIG. 1) and object 120 (such as time-of-flight information), information associated with one or more angles between sensor 116 and object 120 (such as angle 516 along a vertical direction 518, e.g., angle-of-arrival information) and/or Doppler information (such as information associated with a velocity 520 of object 120 relative to vehicle 110).

In some embodiments, electronic device 112 acquires the optical image using two or more imaging sensors or cameras. Thus, in some embodiments, the optical image includes stereoscopic information.

Moreover, electronic device 112 may measure radar information 512 using a variety of antenna configurations. For example, electronic device 112 (or sensor 116 in FIGS. 1 and 2) may include multiple antennas. Different subsets of these antennas may be used to transmit and/or receive radar signals. In some embodiments, a first subset of the antennas used to transmit radar signals and a second subset of the antennas used to receive reflected radar signals are dynamically adapted, such as based on environmental conditions, a size of object 120, a distance or range 514 to object 120, a location of object 120 relative to vehicle 110, etc. By varying the number of transmit and receive antennas, the angular resolution of the radar can be changed. In particular, one transmit antenna and four receive antennas (1T/4R) may have an angular resolution of approximately 28.5°, two transmit antennas and four receive antennas (2T/4R) may have an angular resolution of approximately 15°, three transmit antennas and four receive antennas (3T/4R) may have an angular resolution of approximately 10°, etc. More generally, the angular resolution with one transmit antenna and N receive antennas (1T/NR) may be approximately 114°/N. Thus, if there is one transmit antenna and 192 receive antennas, the angular resolution may be less than one degree. For automotive applications, an angular resolution may be a few degrees at a distance of 200-250 m. As described further below with reference to FIG. 16, note that the transmit and/or receive antennas may be physical antennas or may be virtual antennas in an adaptive array, such as a phased array.

In some embodiments, the transmit antenna(s) has 6-30 dB gain, a beam width between a few degrees and 180°, a transmit power of up to 12 dBm, and an effective range of 200-250 m. Moreover, there may be one transmit antenna and one receive antenna (1T/1R), three transmit antennas and four receive antennas (1T/4R), three transmit antenna and four receive antennas (3T/4R), MIMO for spatial diversity, etc. Furthermore, the location(s) or positions of the transmit and/or the receive antenna(s) may be selected to increase a horizontal and/or a vertical sensitivity. For example, an antenna may be displaced relative to another antenna along a vertical or a horizontal axis or direction by one half of a fundamental or carrier wavelength of the radar signals to increase the (respectively) vertical or horizontal sensitivity.

Additionally, electronic device 112 may optionally process reflected radar signals to extract radar information 512. For example, electronic device 112 may perform windowing or filtering, one or more Fourier or discrete Fourier transforms (with at least 128 or 256 bits), peak detection, etc. In some embodiments, a constant false alarm rate (CFAR) technique is used to identify or determine whether a peak 522 in radar information 512 is significant. In particular, electronic device 112 may calculate statistical metrics (such as a mean and a standard deviation) for a given range, and electronic device 112 may determine if a given peak is significant based on the calculated statistical metrics at different ranges. This approach may allow electronic device 112 to statistically identify radar information 512 of object 120. However, as described further below with reference to FIG. 6, in some embodiments at least some of the processing of the reflected radar signals to extract radar information 512 is performed by electronic device 122 (FIG. 1).

After receiving optical image 510 and radar information 512, electronic device 112 may store optical image 510 and radar information 512 in memory, along with optional timestamps and/or one or more quality-control metrics. In this way, over time, electronic device 112 may amass an initial dataset of optical images and associated radar information about objects in an environment of vehicle 110.

Referring back to FIG. 1, after electronic device 112 has collected or amassed the initial dataset, the data may be transferred to another electronic device for additional processing. For example, electronic device 112 may transfer the initial dataset to electronic device 122, which may be located local or proximate to electronic device 112 or remote from electronic device 112. In some embodiments, electronic device 122 is coupled to electronic device 112 by a cable or a bus (e.g., via an interface), and the initial dataset is transferred to electronic device 122. Alternatively, electronic device 122 may communicate with electronic device 112 using optional network 124, and may access and transfer the initial dataset to electronic device 122 using wireless and/or wired communication.

Figure 6:
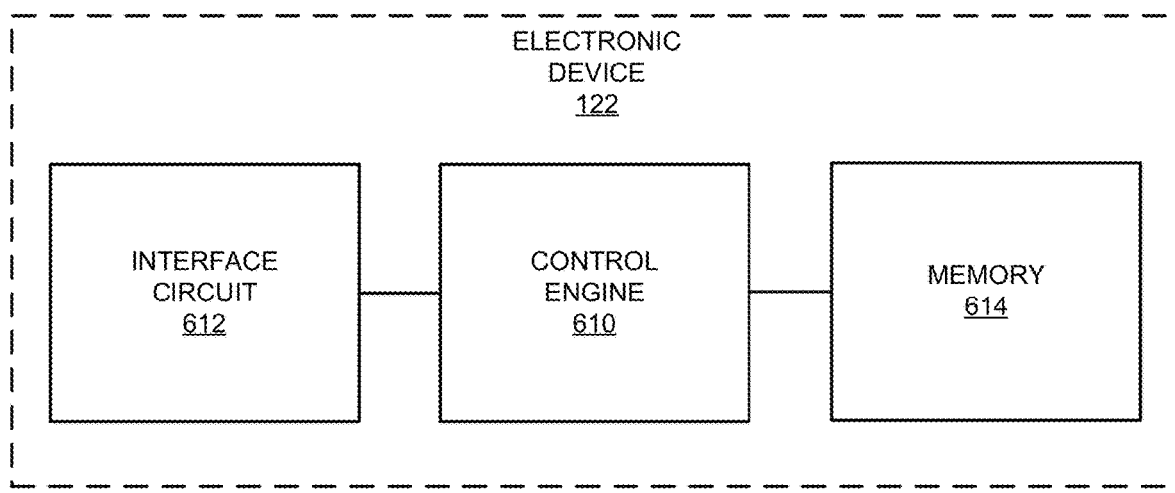
FIG. 6 is a block diagram illustrating an electronic device that is remotely located from the environment in FIG. 1 in accordance with an embodiment of the present disclosure.

In the discussion that follows, the first sensor information in the initial dataset includes one or more optical images and the second sensor information in the initial dataset includes associated raw reflected radar signals or at least partially pre-processed radar information. FIG. 6 presents a block diagram illustrating an example of an electronic device 122 that is remotely located from environment 100 (FIG. 1). As described further below with reference to FIG. 16, this electronic device may include a control engine 610 (such as an integrated circuit and/or a processor, which are sometimes referred to as 'control logic') that performs the annotation technique. In particular, control engine 610 may receive, via interface circuit 612 (which is coupled to or which communicates with electronic device 112 in FIGS. 1 and 2), an optical image associated with an object (such as object 120 in FIG. 1) and radar information associated with the object (and, more generally, the other sensor information), where the optical image and the radar information have associated timestamps that are concurrent or in close temporal proximity.

Then, control engine 610 may identify the object based at least in part on the optical image and/or the radar information. For example, control engine 610 may apply one or more neural networks (e.g., a convolutional neural network) to the optical image to identify/classify the object. The one or more neural networks may be arranged in or may define a classification hierarchy to iteratively identify object 120, such as animal/non-animal, then human/non-human animal, etc., vehicle/non-vehicle, type of vehicle, etc., or street sign/non-street sign, type of street sign, etc. Alternatively or additionally, a wide variety of image-processing and classification techniques may be used to extract features from the optical image, such as one or more of: normalizing a magnification or a size of object 120, rotating object 122 to a predefined orientation, extracting the features that may be used to identify object 120, etc. Note that the extracted features may include: edges associated with one or more potential objects in the optical image, corners associated with the potential objects, lines associated with the potential objects, conic shapes associated with the potential objects, color regions within the optical image, and/or texture associated with the potential objects. In some embodiments, the features are extracted using a description technique, such as: scale invariant feature transform (SIFT), speed-up robust features (SURF), a binary descriptor (such as ORB), binary robust invariant scalable keypoints (BRISK), fast retinal keypoint (FREAK), etc. Furthermore, control engine 610 may apply one or more supervised or machine-learning techniques to the extracted features to identify/classify object 120, such as: support vector machines, classification and regression trees, logistic regression, LASSO, linear regression and/or another (linear or nonlinear) supervised-learning technique.

Moreover, control engine 610 may extract a signature associated with object 120 from the radar information. Extracting the signatures may involve at least some of the processing of reflected radar signals to extract radar information. For example, control engine 610 may perform windowing or filtering, one or more Fourier or discrete Fourier transforms (with at least 128 or 256 bits), peak detection, etc. In some embodiments, a constant false alarm rate (CFAR) technique is used to identify or determine whether a peak in the radar information is significant. In particular, control engine 610 may calculate statistical metrics (such as a mean and a standard deviation) for a given range, and control engine 610 may determine if a given peak is significant based on the calculated statistical metrics at different ranges. This approach may allow control engine 610, separately or in conjunction with processing performed by electronic device 112 (FIGS. 1 and 2), to statistically identify the radar information of object 120.

The resulting signature of object 120 may include multiple dimensions. For example, the signature may include one or more of: a range to object 120, a first angle to object 120 along a first axis (such as a horizontal axis), Doppler information associated with object 120 and/or a second angle to object 120 along a second axis (such as a vertical axis).

Next, control engine 610 may store annotation information associated with identified object 120 and the extracted signature in a data structure in memory 614, such as a computer-readable storage medium. For example, as described further below with reference to FIG. 7, control engine 610 may store at least annotation information (such as a name or classification of identified object 120) and the extracted signature in associated memory locations.

Thus, in the annotation technique, an identification/classification technique may be applied to the optical image (and, more generally, the first sensor information) to determine a known annotation/classification of an object in the optical image, and this known annotation/classification may be used to label the extracted signature from the radar information (and, more generally, the second sensor information). In this way, knowledge associated with the optical image may be used to bootstrap knowledge associated with the radar information. As described further below with reference to FIG. 10, in the process an annotated data structure or dataset may be built that can be used to train a predictive model, such as a neural network and, more generally, an identification/classification engine based a supervised-learning technique. This predictive model may take radar information (and, more generally, the second sensor information) or one or more dimensions of an extracted signature as an input, and may output an identification/classification of one or more objects associated with the radar information. This capability (i.e., the predictive model) may be used to facilitate self-driving applications based, at least in part, on radar. Consequently, in some embodiments, control engine 610 may use the annotated data structure or dataset to train a predictive model.

While the preceding discussion illustrates certain processing performed by or functionality of, respectively, electronic devices 112 (FIGS. 1 and 2) and 122, in other embodiments the functionality of electronic device 112 (FIGS. 1 and 2) may be performed more or less by electronic device 122 or vice versa. Thus, operations in the measurement technique and/or the annotation technique may be performed locally by electronic device 112 (FIGS. 1 and 2) on vehicle 110 (FIG. 1) and/or remotely by electronic device 122. Consequently, in some embodiments some or all of the operations in the measurement technique and/or the annotation technique are performed in real-time by electronic device 112 (FIGS. 1 and 2).

Figure 7:
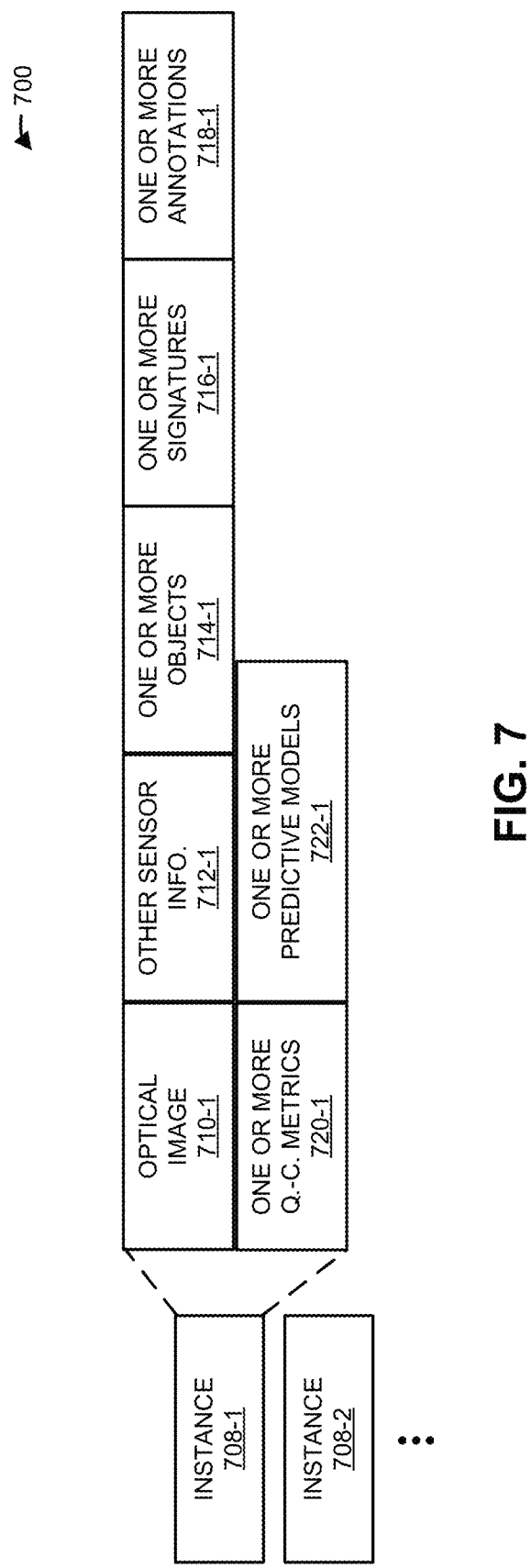
FIG. 7 is a block diagram illustrating a data structure for use in conjunction with the electronic device of FIGS. 1 and 6 in accordance with an embodiment of the present disclosure.

FIG. 7 presents a block diagram illustrating an example of a data structure 700 for use in conjunction with electronic device 122 (FIGS. 1 and 6). In particular, data structure 700 may include: one or more instances 708 of optional optical images 710, one or more associated instances of other sensor information 712 (such as radar information), one or more features of optional objects 714 identified in or associated with optical images 710 and/or other sensor information 712, one or more signatures 716 associated with other sensor information 712 (such as a range to an object, a first angle to the object along a first axis, Doppler information associated with the object and/or a second angle to the object along a second axis), one or more annotations 718 associated with the one or more signatures 716, one or more optional quality-control metrics 720, and/or information specifying one or more optional predictive models 722 that are trained based data structure 700. Note that data structure 700 may include fewer or additional fields, two or more fields may be combined, and/or a position of a given field may be changed.

Figure 8:
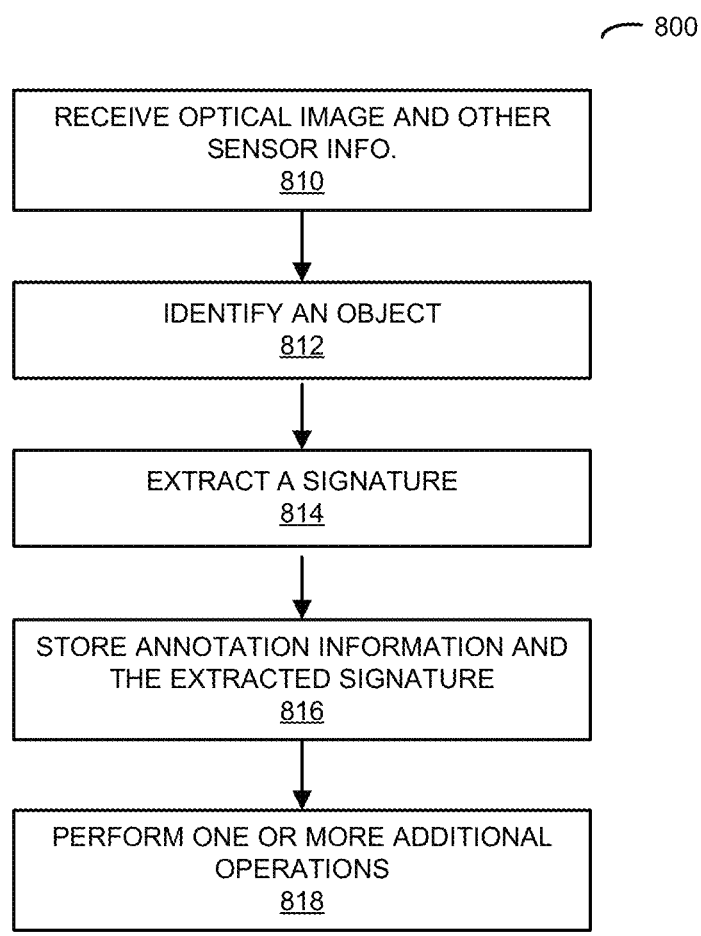
FIG. 8 is a flow diagram illustrating a method for generating an annotated dataset in accordance with an embodiment of the present disclosure.

FIG. 8 presents a flow diagram illustrating an example of a method 800 for generating an annotated dataset. This method may be performed by an electronic device (such as electronic device 122 in FIGS. 1 and 6) or a component in the electronic device (such as an integrated circuit or a processor). During operation, the electronic device may receive an optical image (operation 810) associated with an object and other sensor information (operation 810) associated with the object, where the optical image and the other sensor information have associated timestamps that are concurrent or in close temporal proximity (such as within 1 ms, 5 ms, 10 ms, 50 ms, 100 ms, 150 ms or 300 ms). For example, the electronic device may receive the optical image and the other sensor information via an interface circuit. Alternatively or additionally, the receiving may involve accessing the optical image and the other sensor information in memory, such as a computer-readable storage medium. In some embodiments, the electronic device acquires the optical image and performs another measurement of the other sensor information, such as a radar measurement. Note that the electronic device may include multiple antennas. A first subset of the antennas may be used to transmit signals, and a second subset of the antennas may be used to receive signals. The first subset and the second subset may be dynamically adapted during one measurement or different measurement instances.

Then, the electronic device may identify the object (operation 812) based at least in part on the optical image and/or the other sensor information. For example, the object may be identified based on the optical image. In some embodiments, the object is identified using one or more neural networks. However, in general, a variety of image-processing and/or classification techniques may be used in operation 812, such as one or more of: normalizing a magnification or a size of the object, rotating the object to a predefined orientation, extracting the features that may be used to identify the object, etc. Note that the extracted features may include: edges associated with one or more potential objects in the optical image, corners associated with the potential objects, lines associated with the potential objects, conic shapes associated with the potential objects, color regions within the optical image, and/or texture associated with the potential objects. In some embodiments, the features are extracted using a description technique, such as: scale invariant feature transform (SIFT), speed-up robust features (SURF), a binary descriptor (such as ORB), binary robust invariant scalable keypoints (BRISK), fast retinal keypoint (FREAK), etc. Furthermore, supervised or machine-learning techniques may be applied to the extracted features to identify/classify the object, such as: support vector machines, classification and regression trees, logistic regression, LASSO, linear regression and/or another (linear or nonlinear) supervised-learning technique.

Moreover, the electronic device may extract a signature (operation 814) associated with the object from the other sensor information. Note that signature may include one or more features associated with radar information. For example, a signature may include multiple dimensions, such as one or more of: a range to the object, a first angle to the object along a first axis, Doppler information associated with the object and/or a second angle to the object along a second axis.

Next, the electronic device may store annotation information (operation 816) associated with the identified object and the extracted signature (operation 816) in a data structure (such as data structure 700 in FIG. 7) in memory, such as a computer-readable storage medium.

In some embodiments, method 800 includes one or more optional additional operations (operation 818). For example, the electronic device may train a predictive model based at least in part on information in the data structure.

Figure 9:
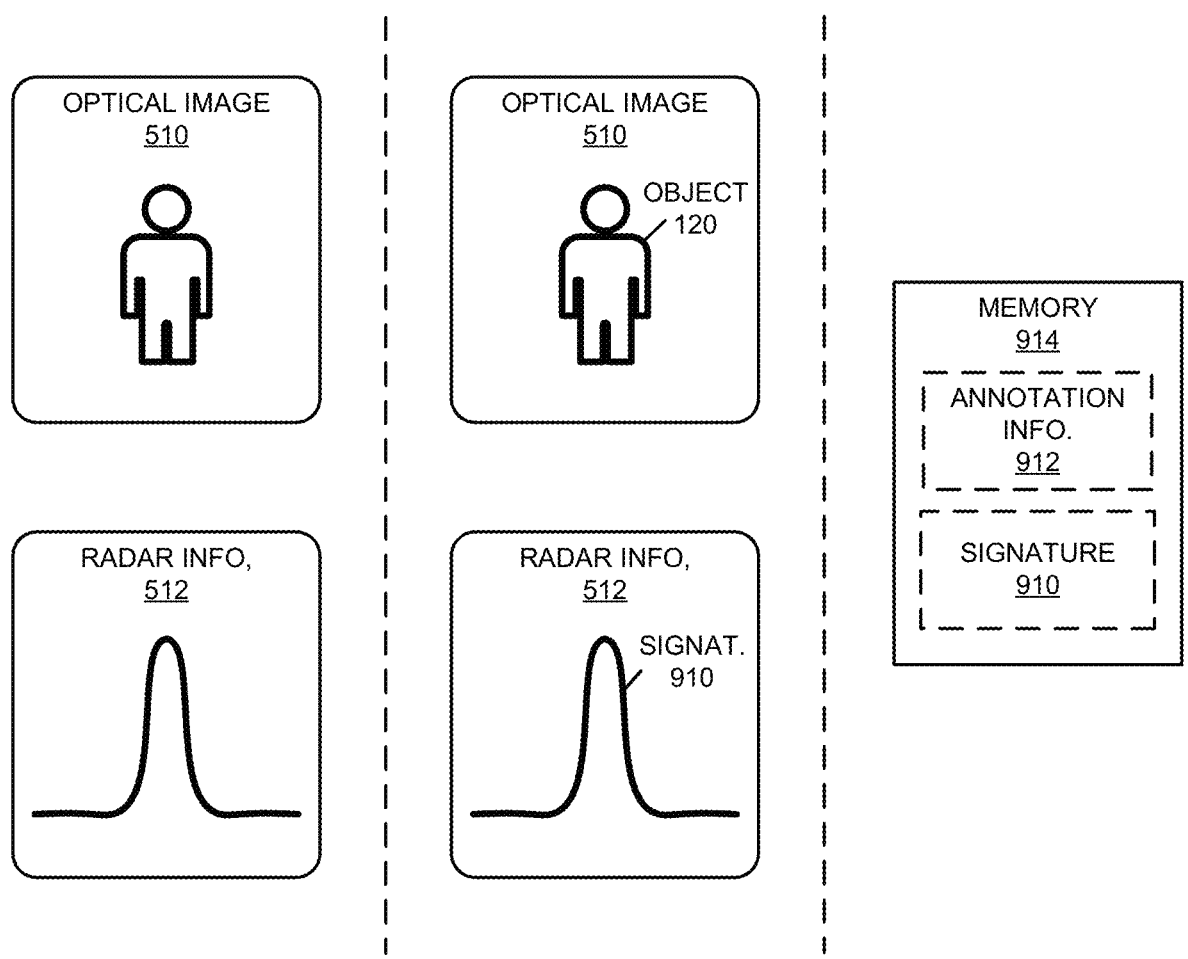
FIG. 9 is a drawing illustrating generating an annotated dataset using the electronic device of FIGS. 1 and 6 in accordance with an embodiment of the present disclosure.

Embodiments of the annotation technique are further illustrated in FIG. 9, which presents a drawing illustrating an example of generating an annotated dataset using electronic device 122 of FIGS. 1 and 6. Electronic device 112 in vehicle 110 may provide optical image 510 and associated radar information 512 to electronic device 122, either after vehicle 110 (FIG. 1) is no longer operating (i.e., after the optical image and associated radar information were acquired) or while vehicle 110 (FIG. 1) is operating (e.g., in real-time as the optical image and associated radar information are acquired). Then, electronic device 122 may identify object 120 in optical image 120 and may extract signature 910 from radar information 512. Next, electronic device 122 may store annotation information 912 based on identified object 120 (such as a name of object 120, a type or classification of object 120, e.g., a person, a dog, a car, a truck, a building, a street sign, etc.) and extracted signature 910 in related locations in memory 914, such as in a data structure in memory 914. In this way, over time, electronic device 122 may amass an annotated dataset of annotations and associated radar signatures about objects in an environment of vehicle 110, which may be used to train one or more predictive models.

Figure 10:
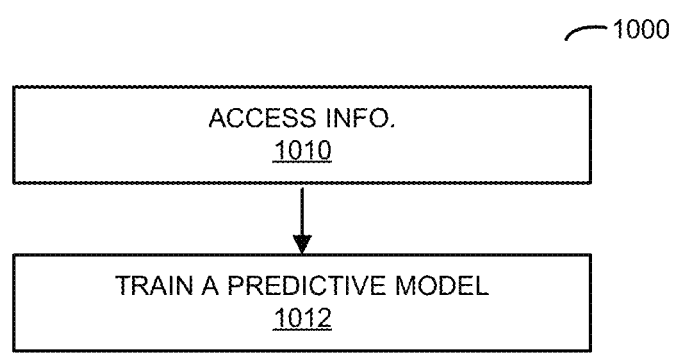
FIG. 10 is a flow diagram illustrating a method for training a predictive model in accordance with an embodiment of the present disclosure.

FIG. 10 presents a flow diagram illustrating an example of a method 1000 for training a predictive model. This method may be performed by an electronic device (such as electronic device 122 in FIGS. 1 and 6) or a component in the electronic device (such as an integrated circuit or a processor). During operation, the electronic device may access information (operation 1010) in an annotated dataset, where the annotated dataset includes annotations (such as names or classifications of one or more objects) and associated signatures of the one or more objects.

Then, the electronic device may train the predictive model (operation 1012) based on the information in the annotated dataset. For example, the training may continue until a predictive criterion is achieved, such as a predictive accuracy of more than 90, 95, 98 or 99%, a corresponding false-positive rate and true-positive rate, a receiver operator characteristic exceeding a threshold value (such as 0.9), etc. The predictive model may include one or more neural networks. Alternatively or additionally, the electronic device may train the predictive model using one or more supervised or machine-learning techniques, such as: support vector machines, classification and regression trees, logistic regression, LASSO, linear regression and/or another (linear or nonlinear) supervised-learning technique. Consequently, during the training, one or more dimensions in the signatures may be used as inputs and the predicted output from the predictive model may be compared to the annotations. Therefore, the predictive model may use one or more dimensions in the signatures as inputs and may output a predicted annotation. Note that there may be multiple outputs from the predictive model, such as numerical values or weights reflecting the probabilities that a signature is associated with different types of objects. In this way, the predictive model may provide statistical information for multiple 'answers' that can be used to guide further decision making, such as navigation of an autonomous vehicle.

Instead of determining navigation information, in some embodiments radar information is used to provide location information for a vehicle having one or more non-retractable wheels that, during operation, are in contact with a road or driving surface, such as a car, a truck, a bus, etc. For example, radar signals may be transmitted approximately perpendicular to a direction of motion of the vehicle, and received reflected radar signals may be analyzed as a sequence to determine a location of the vehicle. In particular, the coherent received reflected radar signals may be analyzed as a function of time to provide a synthetic aperture of a larger antenna or aperture. This approach may improve the resolution (such as an angular resolution) of the radar and may allow the radar to detect edges, such as a corner of a building, while keeping the cost of the transmit and receive antenna(s) low. In conjunction with a predefined map of reflected radar signals (or, more generally, signatures) and locations (such as locations determined using a global positioning system), this side-view synthetic-aperture radar may be used to dynamically determine locations of the vehicle.

Figure 11:
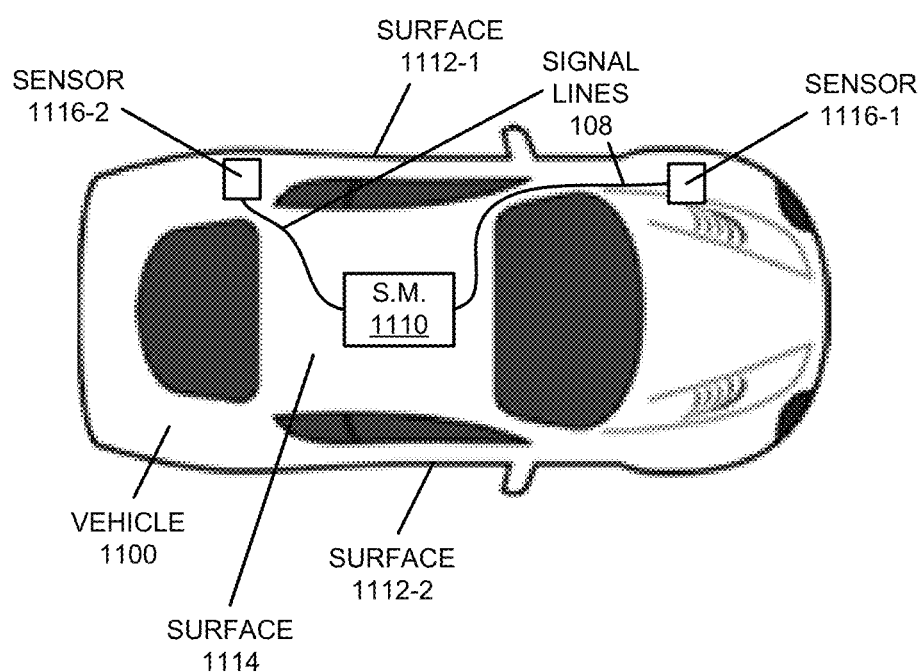
FIG. 11 is a drawing illustrating a vehicle having a sensor module in accordance with an embodiment of the present disclosure.

This approach is illustrated in FIG. 11, which presents a drawing illustrating an example of a vehicle 1100 having a sensor module (S.M.) 1110 (which is sometimes referred to as an 'electronic device'). As described below with reference to FIG. 12, this sensor module may be similar to electronic device 112 in FIGS. 1 and 2, except that may be used to perform measurements of radar information using two or more sensors 1116, instead of the measurements of the first sensor information and the second sensor information. Note that sensor module 1110 and/or sensors 1116 may be positioned on or proximate to a side-facing surface (such as either or both of sides or surfaces 1112) of vehicle 1100. Alternatively, sensor module 1110 and/or sensors 1116 may be mounted or positioned on a top surface 1114 (such as a roof) of vehicle 1100 and an aperture of sensor module 1110 may rotate about a vertical axis, so that sensor module 1110 'sweeps' an arc (e.g., 120°, 180° or 360°).

In some embodiments, sensor module 1110 includes or is coupled to multiple antennas, such as in sensors 1116. A first subset of the antennas may be used to transmit the radar signals, and a second subset of the antennas may be used to receive the reflected signals. Note that the first subset and the second subset may be dynamically adapted. Additionally, sensor module 1110 may include an oscillator that provides two or more synchronized radar signals to different antennas (such as in sensors 1116) at different locations on vehicle 1100.

Figure 12:
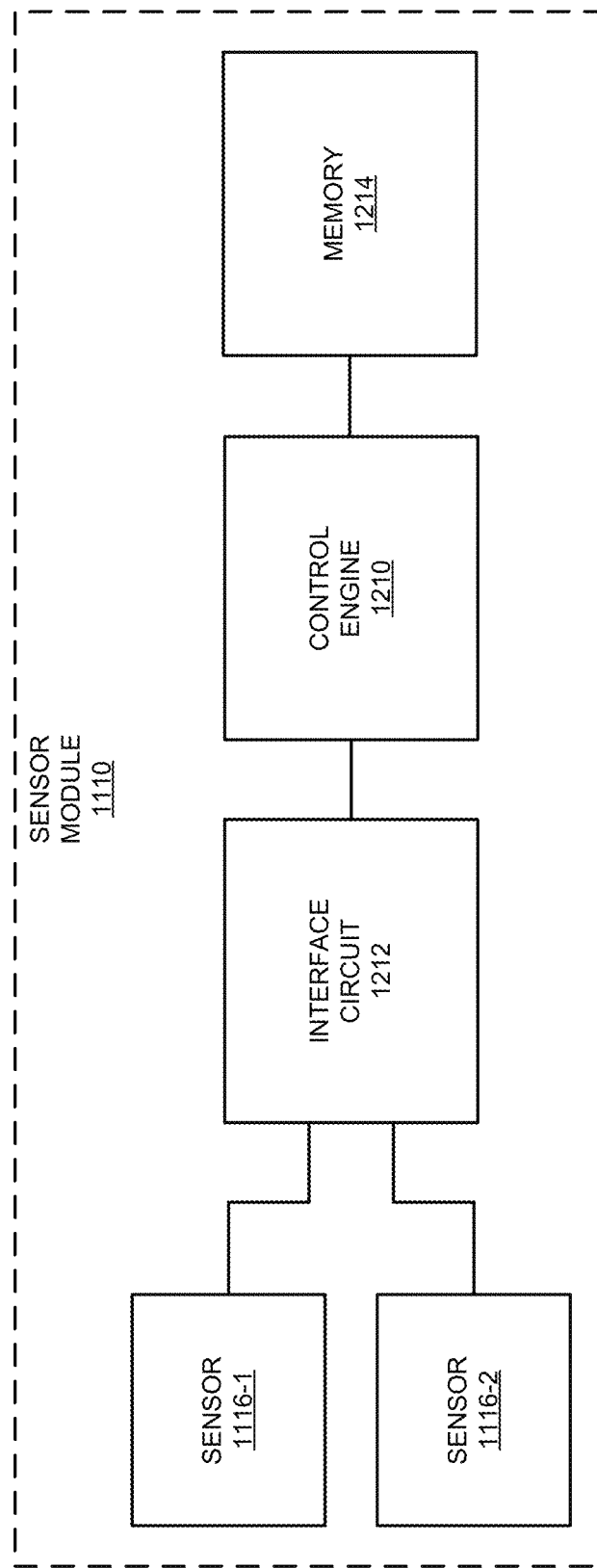
FIG. 12 is a block diagram illustrating the sensor module of FIG. 11 in accordance with an embodiment of the present disclosure.

FIG. 12 presents a block diagram illustrating an example of sensor module 1110. During operation of sensor module 1110, control engine 1210 (such as an integrated circuit or a processor) may transmit radar signals approximately perpendicular to a direction of motion of vehicle 1100 (FIG. 11). For example, control engine 1210 may provide, via interface circuit 1212, one or more signals or instructions to one or more sensors 1116 (which may be included in or coupled to sensor module 1110) to transmit the radar signals. Thus, the one or more sensors 1116 illustrated in FIG. 11 are optional in sensor module 1110.

Then, control engine 1210 may receive reflected radar signals. For example, one or more sensors 1116 may receive the reflected radar signals, and may provide the reflected radar signals to control engine 1210 via interface circuit 1212.

Furthermore, control engine 1210 may analyze a time sequence of the reflected radar signals, which may provide an effective or synthetic aperture for the radar that is larger (and, thus, a resolution than is smaller) than the physical dimensions of the aperture of the radar from sensors 1116 in or associated with sensor module 1110. For example, the time sequence may have a duration of up to 500 ms. Note that the analysis of the time sequence may provide a synthetic aperture for the reflected radar signals.

Next, control engine 1210 may determine a location of vehicle 1100 (FIG. 11) based at least in part on the analyzed time sequence of reflected radar signals. For example, control engine 1210 may access, in memory 1214, a predetermined or predefined look-up table or map of reflected radar signals and known locations, and control engine 1210 may compare the reflected radar signals to the predetermined or predefined look-up table or map (e.g., control engine 1210 may perform a look up), so that the location of vehicle 1100 (FIG. 11) can be determined.

In some embodiments, electronic device 112 (FIGS. 1 and 2), electronic device 122 (FIGS. 1 and 6) and/or sensor module 1110 include fewer or additional components, two or more components are combined into a single component and/or positions of one or more components are changed. For example, in some embodiments, electronic device 122 (FIGS. 1 and 6) includes sensors 114 and/or 116 (FIG. 2).

Figure 13:
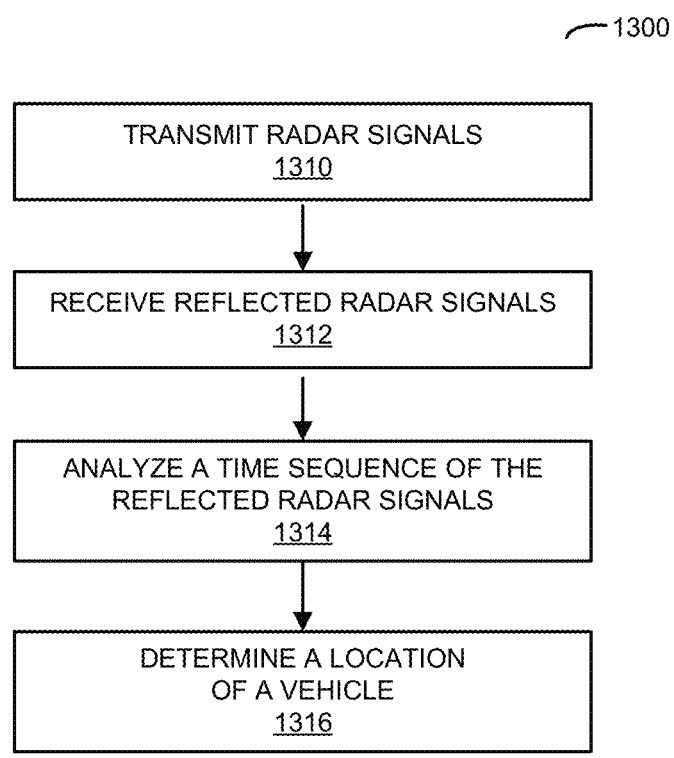
FIG. 13 is a flow diagram illustrating a method for determining a location of a vehicle in accordance with an embodiment of the present disclosure.

FIG. 13 presents a flow diagram illustrating an example of a method 1300 for determining a location of a vehicle. This method may be performed by a sensor module (such as sensor module 1110 in FIGS. 11 and 12) or a component in the sensor module (such as an integrated circuit or a processor). Note that the sensor module may positioned on or directed towards a side-facing surface of the vehicle.

During operation, the sensor module may transmit radar signals (operation 1310) approximately perpendicular to a direction of motion of the vehicle. Then, the sensor module may receive reflected radar signals (operation 1312). Furthermore, the sensor module may analyze a time sequence of the reflected radar signals (operation 1314). Note that the analysis of the time sequence may provide a synthetic aperture for the reflected radar signals. Next, the sensor module may determine a location of the vehicle (operation 1316) based at least in part on the analyzed time sequence of reflected radar signals.

In some embodiments, the sensor module includes or is coupled to multiple antennas. A first subset of the antennas may be used to transmit the radar signals, and a second subset of the antennas may be used to receive the reflected signals. Note that the first subset and the second subset may be dynamically adapted. Additionally, the sensor module may include an oscillator that provides two or more synchronized radar signals to different antennas at different locations on the vehicle.

In some embodiments of methods 400 (FIG. 4), 800 (FIG. 8), 1000 (FIG. 10), and/or 1300 there may be additional or fewer operations. Moreover, the order of the operations may be changed, and/or two or more operations may be combined into a single operation.

Figure 14:
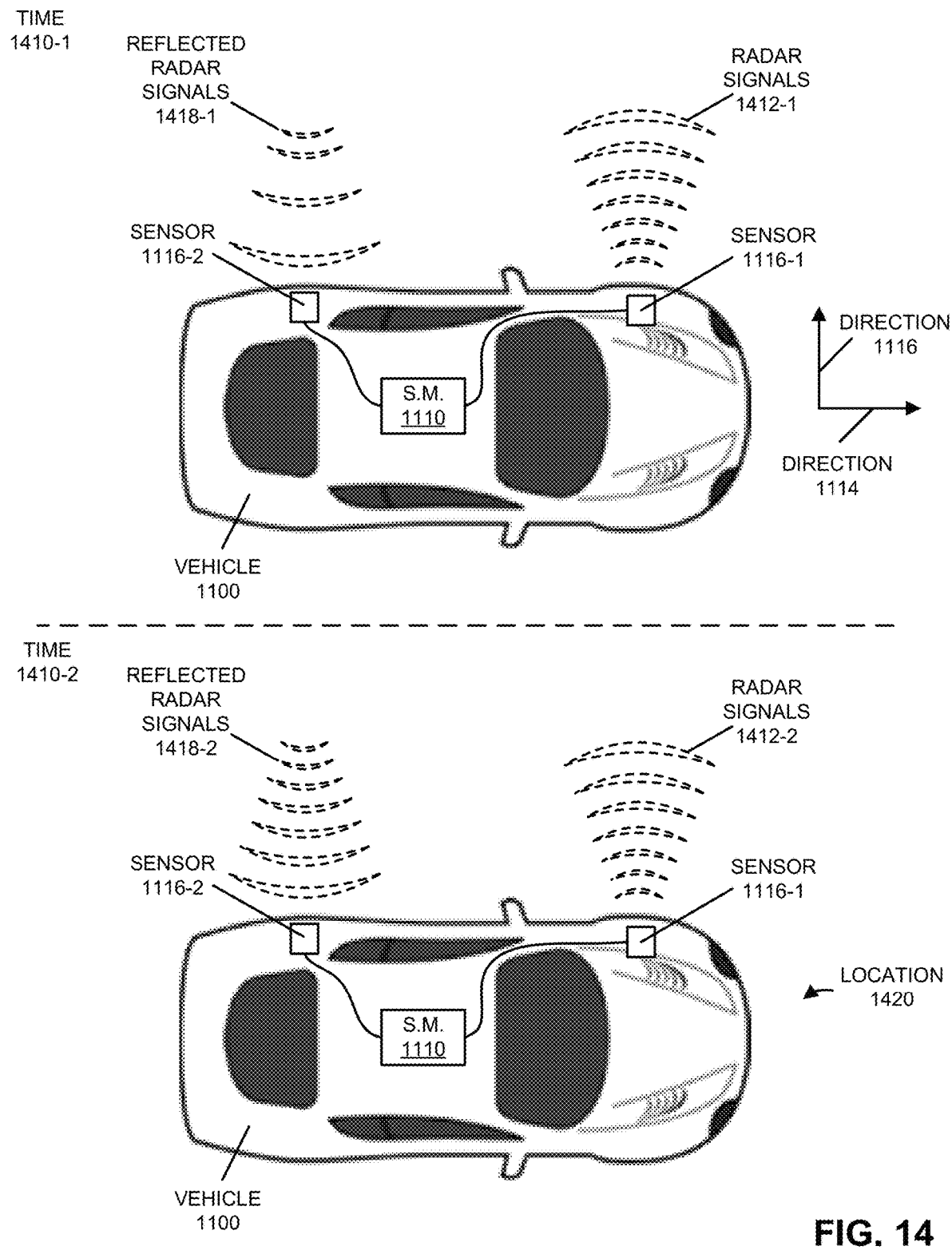
FIG. 14 is a drawing illustrating determining a location of the vehicle of FIG. 11 in accordance with an embodiment of the present disclosure.

Embodiments of the location technique are further illustrated in FIG. 14, which presents a drawing illustrating an example of determining a location of vehicle 1100. In particular, at a set of times 1410, sensor module 1110 (and/or sensors 1116) may transmit radar signals 1412 along a direction 1414 approximately perpendicular to a direction 1416 of motion of vehicle 1100. Following each transmission, sensor module 1110 (and/or sensors 1116) may receive reflected radar signals 1418, such as reflected radar signals from an edge of a building. Furthermore, sensor module 1110 may analyze a time sequence of the reflected radar signals 1418 to provide a synthetic aperture for reflected radar signals 1418. Next, sensor module 1110 may determine a location 1420 of vehicle 1100 based at least in part on the analyzed time sequence of reflected radar signals.

Figure 15:
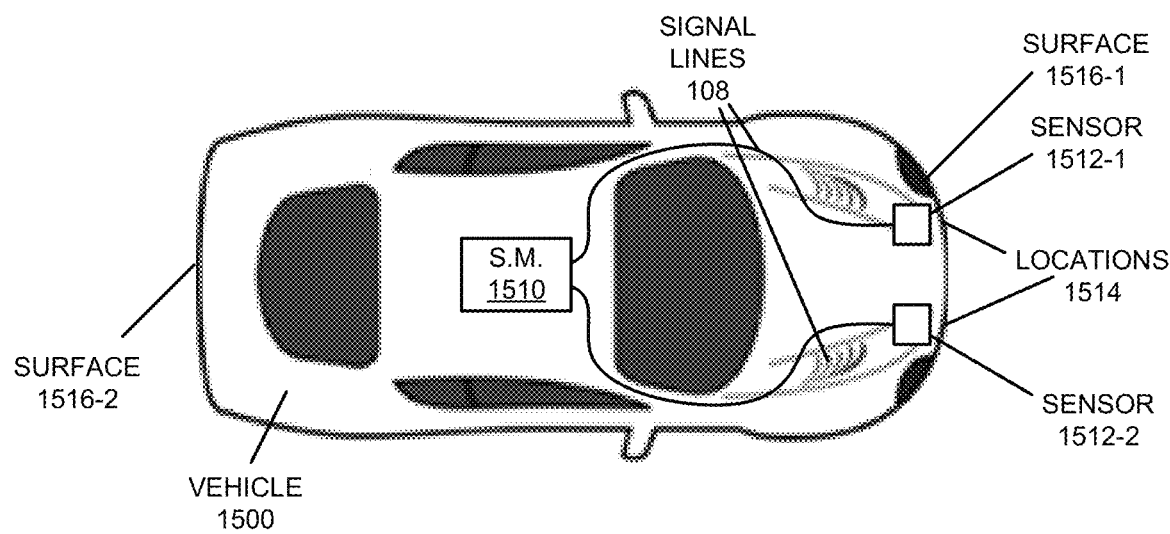
FIG. 15 is a drawing illustrating a vehicle having a sensor module in accordance with an embodiment of the present disclosure.

While sensor module 1110 transmitted radar signals 1412 approximately perpendicular to direction 1416 of motion of vehicle 1100, in other embodiments the radar signals are transmitted approximately parallel to the direction of motion of a vehicle. In these embodiments, the sensor module may be located on, proximate to or directed towards a front-facing or a rear-facing surface of the vehicle. This is shown in FIG. 15, which presents a drawing illustrating an example of a vehicle 1500 having a sensor module 1510 (which may be the same as or similar to sensor module 1110 in FIGS. 11 and 12).

In some embodiments of vehicle 1500, sensor module 1510 may output two or more radar signals from sensors 1512 at different locations 1514 on or proximate to the front-facing or rear-facing surfaces 1516 of vehicle 1500. For example, sensors 1512 may be embedded in the front and/or the rear bumper of vehicle 1500. Note that the radar signals may be locked to a common oscillator in sensor module 1510, i.e., the radar signals may be synchronized, e.g., by outputting an oscillator signal from sensor module 1510 to sensors 1512 via signal lines 108 (such as coaxial cables or transmission lines). This approach may increase the baseline between the radar signals, which may improve the resolution of the radar information.

Figure 16:
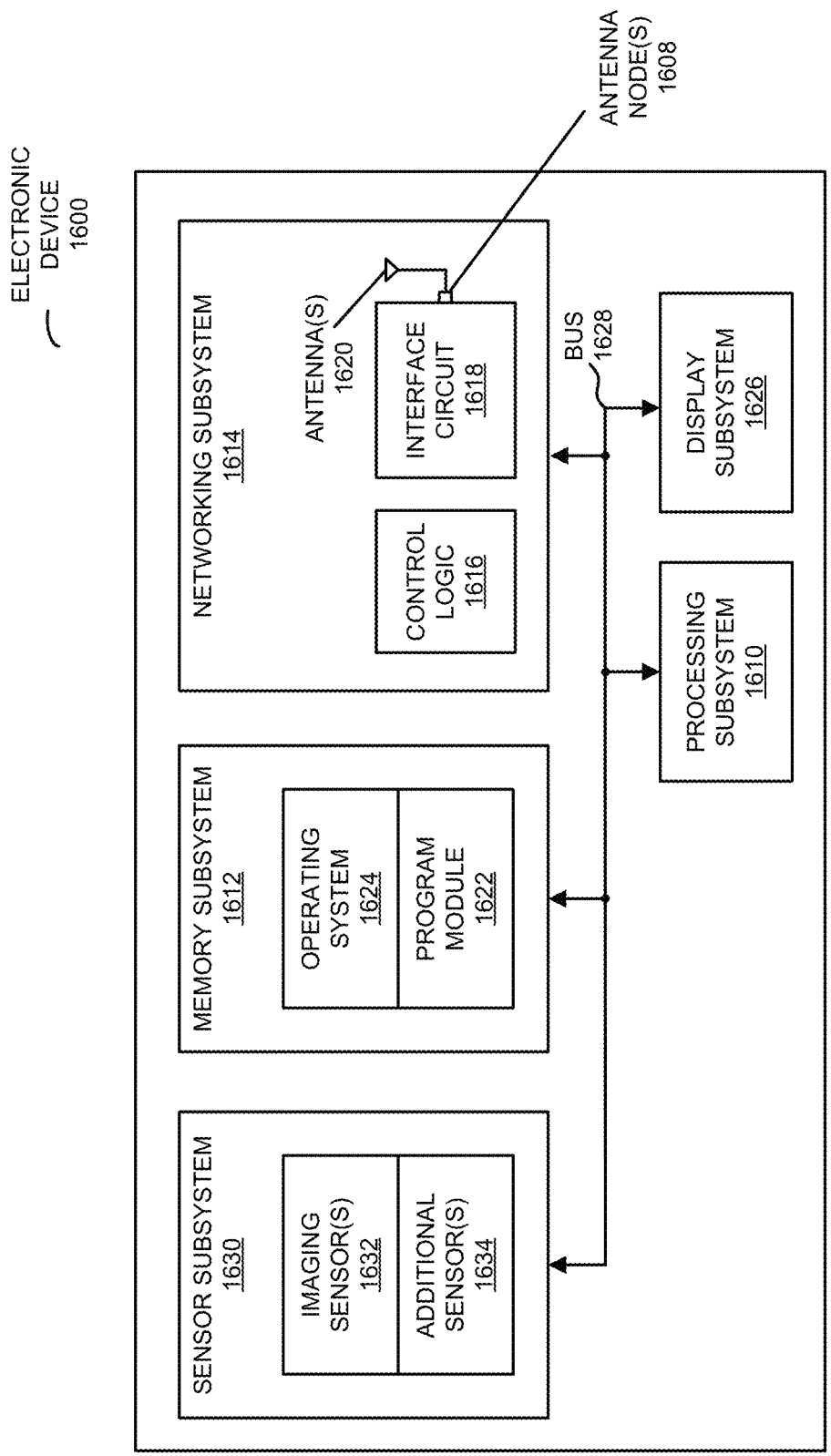
FIG. 16 is a block diagram illustrating an electronic device in accordance with an embodiment of the present disclosure.

We now describe embodiments of an electronic device, which may perform at least some of the operations in the measurement technique, the annotation technique and/or the location technique. FIG. 16 presents a block diagram illustrating an example of an electronic device 1600, such as electronic device 112 (FIGS. 1 and 2), electronic device 122 (FIGS. 1 and 6) or sensor module 1110 (FIGS. 11 and 12). This electronic device includes processing subsystem 1610, memory subsystem 1612, and networking subsystem 1614. Processing subsystem 1610 includes one or more devices configured to perform computational operations. For example, processing subsystem 1610 can include one or more microprocessors, ASICs, microcontrollers, programmable-logic devices, graphical processor units (GPUs) and/or one or more digital signal processors (DSPs).

Memory subsystem 1612 includes one or more devices for storing data and/or instructions for processing subsystem 1610 and networking subsystem 1614. For example, memory subsystem 1612 can include dynamic random access memory (DRAM), static random access memory (SRAM), and/or other types of memory (which collectively or individually are sometimes referred to as a 'computer-readable storage medium'). In some embodiments, instructions for processing subsystem 1610 in memory subsystem 1612 include: one or more program modules or sets of instructions (such as program module 1622 or operating system 1624), which may be executed by processing subsystem 1610. Note that the one or more computer programs may constitute a computer-program mechanism. Moreover, instructions in the various modules in memory subsystem 1612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1610.

In addition, memory subsystem 1612 can include mechanisms for controlling access to the memory. In some embodiments, memory subsystem 1612 includes a memory hierarchy that comprises one or more caches coupled to memory in electronic device 1600. In some of these embodiments, one or more of the caches is located in processing subsystem 1610.

In some embodiments, memory subsystem 1612 is coupled to one or more high-capacity mass-storage devices (not shown). For example, memory subsystem 1612 can be coupled to a magnetic or optical drive, a solid-state drive, or another type of mass-storage device. In these embodiments, memory subsystem 1612 can be used by electronic device 1600 as fast-access storage for often-used data, while the mass-storage device is used to store less frequently used data.

Networking subsystem 1614 includes one or more devices configured to couple to and communicate on a wired and/or wireless network (i.e., to perform network operations), including: control logic 1616, an interface circuit 1618 and one or more antennas 1620 (or antenna elements). (While FIG. 16 includes one or more antennas 1620, in some embodiments electronic device 1600 includes one or more nodes, such as nodes 1608, e.g., a pad, which can be coupled to the one or more antennas 1620. Thus, electronic device 1600 may or may not include the one or more antennas 1620.) For example, networking subsystem 1614 can include a Bluetooth networking system, a cellular networking system (e.g., a 3G/4G network such as UMTS, LTE, etc.), a USB networking system, a networking system based on the standards described in IEEE 802.11 (e.g., a Wi-Fi networking system), an Ethernet networking system, and/or another networking system.

Note that a transmit or receive antenna pattern (or antenna radiation pattern) of electronic device 1600 may be adapted or changed using pattern shapers (such as reflectors) in one or more antennas 1620 (or antenna elements), which can be independently and selectively electrically coupled to ground to steer the transmit antenna pattern in different directions. (Alternatively or additionally, the transmit or receive antenna pattern may be adapted or changed using a phased array.) Thus, if one or more antennas 1620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1600 that is of interest, and one or more local minima that reduce gain in the direction of other electronic devices that are not of interest. In this way, the given antenna pattern may be selected, e.g., to target an object of interest in an environment of electronic device 1600 or an object that is included in an optical image acquired by one or more imaging sensors.

Networking subsystem 1614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1600 may use the mechanisms in networking subsystem 1614 for performing simple wireless communication between the electronic devices, e.g., transmitting frames and/or scanning for frames transmitted by other electronic devices.

Within electronic device 1600, processing subsystem 1610, memory subsystem 1612, and networking subsystem 1614 are coupled together using bus 1628. Bus 1628 may include an electrical, optical, and/or electro-optical connection that the subsystems can use to communicate commands and data among one another. Although only one bus 1628 is shown for clarity, different embodiments can include a different number or configuration of electrical, optical, and/or electro-optical connections among the subsystems.

In some embodiments, electronic device 1600 includes an optional display subsystem 1626 for displaying information on a display, which may include a display driver and the display, such as a liquid-crystal display, a multi-touch touchscreen, etc.

Furthermore, electronic device 1600 may include a sensor subsystem 1630, which may include one or more imaging sensors 1632 for acquiring images (such as a CCD or a CMOS sensor) and/or one or more additional sensors 1634 (such as a light-intensity sensor, radar, sonar, lidar, etc.).

Electronic device 1600 can be (or can be included in) a wide variety of electronic devices. For example, electronic device 1600 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, a transceiver, a measurement device, and/or another electronic device.

Although specific components are used to describe electronic device 1600, in alternative embodiments, different components and/or subsystems may be present in electronic device 1600. For example, electronic device 1600 may include one or more additional processing subsystems, memory subsystems, networking subsystems, display subsystems and/or measurement subsystems. Additionally, one or more of the subsystems may not be present in electronic device 1600. Moreover, in some embodiments, electronic device 1600 may include one or more additional subsystems that are not shown in FIG. 16. Also, although separate subsystems are shown in FIG. 16, in some embodiments some or all of a given subsystem or component can be integrated into one or more of the other subsystems or component(s) in electronic device 1600. For example, in some embodiments program module 1622 is included in operating system 1624 and/or control logic 1616 is included in interface circuit 1618.

Moreover, the circuits and components in electronic device 1600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 1614. The integrated circuit may include hardware and/or software mechanisms that are used for transmitting wireless signals from electronic device 1600 and receiving signals at electronic device 1600 from other electronic devices. Aside from the mechanisms herein described, radios are generally known in the art and hence are not described in detail. In general, networking subsystem 1614 and/or the integrated circuit can include any number of radios. Note that the radios in multiple-radio embodiments function in a similar way to the described single-radio embodiments.

In some embodiments, networking subsystem 1614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

Moreover, another integrated circuit may implement some or all of the functionality related to the measurement technique, the annotation technique and/or the location technique.

In some embodiments, an output of a process for designing a given integrated circuit, or a portion of the given integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the given integrated circuit or the portion of the given integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the imaging technique may be implemented using program module 1622, operating system 1624 (such as a driver for interface circuit 1618) or in firmware in interface circuit 1618. Alternatively or additionally, at least some of the operations in the measurement technique, the annotation technique and/or the location technique may be implemented in a physical layer, such as hardware in interface circuit 1618.

While the preceding embodiments illustrated the use of a vehicle, such as a car, a truck, a bus, etc., in other embodiments the one or more measurement techniques are used in conjunction with a flying vehicle (such as a drone, a helicopter, an airplane, etc.), a boat or a ship, and/or a submersible vehicle (such as a drone or a submarine).

In the preceding description, we refer to 'some embodiments.' Note that 'some embodiments' describes a subset of all of the possible embodiments, but does not always specify the same subset of embodiments. Note that numerical values in the preceding embodiments are illustrative examples of some embodiments. In other embodiments of the imaging technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments

What is claimed is:

1. An electronic device, comprising:
an interface circuit configured to communicate with a first sensor and a second sensor, wherein the second sensor comprises a radar sensor and the second sensor is configured to use a different sensing technique than the first sensor;
memory; and
control logic, coupled to the interface circuit and the memory, which is configured to:
measure, using the first sensor, first sensor information associated with a first field of view and a first timestamp and, using the second sensor, second sensor information associated with a second field of view and a second timestamp, wherein the first sensor information and the second sensor information are associated with operation of a vehicle having one or more non-retractable wheels in contact with a surface, and
wherein the measuring comprises:
determining, using a pretrained predictive model, a predefined or predetermined annotation associated with the first sensor information, wherein the first sensor information is an input of the pretrained predictive model and the predefined or predetermined annotation is an output of the pretrained predictive model, and wherein the predefined or predetermined annotation is associated with an object that is common to the first field of view and the second field of view; and
storing, in the memory, the first sensor information, the second sensor information, and the predefined or predetermined annotation, wherein the predefined or predetermined annotation is stored at a memory location associated with the second sensor information.

2. The electronic device of claim 1, wherein the electronic device is configured to:
determine one or more quality-control metrics based at least in part on the first sensor information and the second sensor information; and
store the one or more quality-control metrics in the memory, wherein the one or more quality-control metrics are stored in at a memory location associated with at least one of the first sensor information or the second sensor information.

3. The electronic device of claim 2, wherein the determining the one or more quality-control metrics comprises analyzing the first sensor information and the second sensor information to confirm that each includes information associated with an object, which is associated with the predefined or predetermined annotation.

4. The electronic device of claim 1, wherein the control logic is configured to train a second predictive model based at least in part on the stored second sensor information and the predefined or predetermined annotation;
wherein the second sensor information is an input of the second predictive model and corresponding classifications of objects are an output of the second predictive model; and
wherein the second predictive model is configured to facilitate operation of an autonomous vehicle.

5. The electronic device of claim 1, wherein the storing of the first sensor information and the second sensor information is based, at least in part, on one or more quality-control metrics.

6. The electronic device of claim 1, wherein the measuring of the first sensor information, the first timestamp, the second sensor information and the second timestamp comprises providing one or more signals or instructions to the first sensor to measure the first sensor information and to the second sensor to measure the second sensor information.

7. The electronic device of claim 1, wherein the electronic device comprises the first sensor and the second sensor; and
wherein apertures of the first sensor and the second sensor are adjacent to each other or are co-located in the electronic device.

8. The electronic device of claim 1, wherein the first sensor comprises an optical imaging sensor, an infrared sensor, a forward looking infrared (FLIR) sensor, a sonar sensor, an optical imaging sensor having a dynamic range or contrast ratio exceeding a threshold value or lidar.

9. A non-transitory computer-readable storage medium for use in conjunction with an electronic device, the computer-readable storage medium storing program instructions, wherein, when executed by the computer system, the program instructions cause the computer system to perform one or more operations comprising:
measuring, using a first sensor, first sensor information associated with a first field of view and a first timestamp and, using a second sensor, second sensor information associated with a second field of view and a second timestamp, wherein the first sensor information and the second sensor information are associated with operation of a vehicle having one or more non-retractable wheels in contact with a surface, and
wherein the second sensor comprises a radar sensor and the second sensor uses a different sensing technique than the first sensor, and
wherein the measuring comprises:
determining, using a pretrained predictive model, a predefined or predetermined annotation associated with the first sensor information, wherein the first sensor information is an input of the pretrained predictive model and the predefined or predetermined annotation is an output of the pretrained predictive model, and wherein the predefined or predetermined annotation is associated with an object that is common to the first field of view and the second field of view; and
storing, in memory in or associated with the electronic device, the first sensor information, the second sensor information, and the predefined or predetermined annotation, wherein the predefined or predetermined annotation is stored at a memory location associated with the second sensor information.

10. The computer-readable storage medium of claim 9, wherein the one or more operations comprise determining one or more quality-control metrics based at least in part on the first sensor information and the second sensor information; and
wherein the storing of the first sensor information and the second sensor information is based, at least in part, on the one or more quality-control metrics.

11. The computer-readable storage medium of claim 10, wherein the determining the one or more quality-control metrics comprises analyzing the first sensor information and the second sensor information to confirm that each includes information associated with an object, which is associated with the predefined or predetermined annotation.

12. The computer-readable storage medium of claim 9, wherein the one or more operations comprise training a second predictive model based at least in part on the stored second sensor information and the predefined or predetermined annotation;
    wherein the second sensor information is an input of the second predictive model and corresponding classifications of objects are an output of the second predictive model; and
    wherein the second predictive model is configured to facilitate operation of an autonomous vehicle.

13. The computer-readable storage medium of claim 9, wherein the storing of the first sensor information and the second sensor information is based, at least in part, on one or more quality-control metrics.

14. The computer-readable storage medium of claim 9, wherein the measuring of the first sensor information, the first timestamp, the second sensor information and the second timestamp comprises providing one or more signals or instructions to the first sensor to measure the first sensor information and to the second sensor to measure the second sensor information.

15. The computer-readable storage medium of claim 9, wherein the first sensor comprises an optical imaging sensor, an infrared sensor, a forward looking infrared (FLIR) sensor, a sonar sensor, an optical imaging sensor having a dynamic range or contrast ratio exceeding a threshold value or lidar.

16. A method for generating a dataset, comprising:
    by an electronic device:
        measuring, using a first sensor, first sensor information associated with a first field of view and a first timestamp and, using a second sensor, second sensor information associated with a second field of view and a second timestamp, wherein the first sensor information and the second sensor information are associated with operation of a vehicle having one or more non-retractable wheels in contact with a surface, and
        wherein the second sensor comprises a radar sensor and the second sensor uses a different sensing technique than the first sensor, and
        wherein the measuring comprises:
        determining, using a pretrained predictive model, a predefined or predetermined annotation associated with the first sensor information, wherein the first sensor information is an input of the pretrained predictive model and the predefined or predetermined annotation is an output of the pretrained predictive model, and wherein the predefined or predetermined annotation is associated with an object that is common to the first field of view and the second field of view; and
        generating the dataset by storing, in memory in or associated with the electronic device, the first sensor information, the second sensor information, and the predefined or predetermined annotation, wherein the predefined or predetermined annotation is stored at a memory location associated with the second sensor information.

17. The method of claim 16, wherein the method comprises determining one or more quality-control metrics based at least in part on the first sensor information and the second sensor information; and
    wherein the storing of the first sensor information and the second sensor information is based, at least in part, on the one or more quality-control metrics.

18. The method of claim 17, wherein the determining the one or more quality-control metrics comprises analyzing the first sensor information and the second sensor information to confirm that each include information associated with an object, which is associated with the predefined or predetermined annotation.

19. The method of claim 16, wherein the first sensor comprises an optical imaging sensor, an infrared sensor, a forward looking infrared (FLIR) sensor, a sonar sensor, an optical imaging sensor having a dynamic range or contrast ratio exceeding a threshold value or lidar.

20. The method of claim 16, wherein the method comprises training a second predictive model based at least in part on the stored second sensor information and the predefined or predetermined annotation;
    wherein the second sensor information is an input of the second predictive model and corresponding classifications of objects are an output of the second predictive model; and
    wherein the second predictive model is configured to facilitate operation of an autonomous vehicle.

\* \* \* \* \*